United States Patent [19]

Sobue

[11] Patent Number: 5,218,446
[45] Date of Patent: Jun. 8, 1993

[54] RELAY UNIT OPTIONALLY CONNECTED TO A RECORDING APPARATUS FOR ADDING A SPECIFIC FUNCTION THERETO

[75] Inventor: Ikuo Sobue, Kawasaki, Japan

[73] Assignee: Canon Kabushiki Kaisha, Tokyo, Japan

[21] Appl. No.: 942,091

[22] Filed: Sep. 8, 1992

Related U.S. Application Data

[63] Continuation of Ser. No. 839,710, Feb. 24, 1992, abandoned, which is a continuation of Ser. No. 452,592, Dec. 19, 1989, abandoned.

[30] Foreign Application Priority Data

Dec. 20, 1988 [JP] Japan ............................... 63-322581
Dec. 22, 1988 [JP] Japan ............................... 63-325562

[51] Int. Cl.⁵ .......................... H04N 1/21; H04N 1/40
[52] U.S. Cl. .................................. 358/296; 358/407; 358/442
[58] Field of Search ............... 358/296, 407, 442, 498; 355/204, 309, 311

[56] References Cited

U.S. PATENT DOCUMENTS

| | | | |
|---|---|---|---|
| 4,436,406 | 3/1984 | Murasaki et al. | 355/309 |
| 4,515,458 | 5/1985 | Masuda et al. | 355/309 X |
| 4,586,813 | 5/1986 | Ide | 355/309 X |
| 4,696,615 | 9/1987 | Ettischer et al. | 355/309 X |
| 4,754,303 | 6/1988 | Ito | 355/311 X |
| 4,804,997 | 2/1989 | Mizude et al. | 355/311 |
| 4,903,139 | 2/1990 | Minter | 358/296 |
| 4,907,097 | 3/1990 | Sobue | 358/461 |
| 4,924,320 | 5/1990 | Tanaka et al. | 358/296 |
| 4,967,240 | 10/1990 | Kitano et al. | 355/309 X |

Primary Examiner—Benjamin R. Fuller
Assistant Examiner—Eric Frahm
Attorney, Agent, or Firm—Fitzpatrick, Cella, Harper & Scinto

[57] ABSTRACT

A recording system including an image data transmission source for sending image data and a recording apparatus for performing a recording operation on the basis of the image data is provided a relay unit connectable between the image data transmission source and the recording apparatus. The relay unit is adapted to add a specific function to the recorded apparatus, such as increased paper capacity or to change a paper ejection position of a recorded sheet. Moreover, such a relay unit may provide an advantageous transfer serial data during a time interval so as to avoid an interface error.

19 Claims, 11 Drawing Sheets

91 : CASSETTE PAPER FEEDER
92 : SEPARATER/CARRIER
93 : FIXER/EJECTOR

RELAY UNIT OPTIONALLY CONNECTED TO A RECORDING APPARATUS FOR ADDING A SPECIFIC FUNCTION THERETO

This application is a continuation of application Ser. No. 07/839,710 filed Feb. 24, 1992, now abandoned, which is a continuation of application Ser. No. 07/452,592 filed Dec. 19, 1989, now abandoned.

BACKGROUND OF THE INVENTION

Field of the Invention

The present invention relates to a relay unit suitably used for a recording apparatus such as a facsimile apparatus, a copying apparatus, or a printer.

Related Background Art

Various types of printers such as laser beam printers have been recently developed and are classified into printers having the following two arrangements:

(1) It is assumed that functions will be added in the near future and various functions are assigned to the hardware or software of the printer. If additional functions are required, only units corresponding to the additional functions are added to the printer.

(2) The number of printer functions is minimized, and hardware or software quality is stabilized so as to aim at low cost.

Since various functions which may be used in the future are included in arrangement (1), the product cost is increased. When a user uses only some of the functions, cost performance is degraded, and redundancy is increased, resulting in inconvenience.

Although quality is stabilized and cost can be reduced, arrangement (2) cannot answer the needs of various types of users.

There is also known a relay unit for sending various types of signals to or receiving them from interfaces of a plurality of apparatuses.

Various relay schemes for relay units of this type have been proposed.

(1) During communication with one of a plurality of external serial interfaces, a relay unit sends a transmission disable signal to the remaining serial interfaces so as not to accept interrupts from these remaining serial interfaces.

(2) When a serial interface interrupt having a higher priority is received, a relay unit immediately interrupts it current communication and connects the interrupt source to a destination serial interface.

According to scheme (1), each external serial interface must perform transmission/reception after it discriminates whether a communication enable state is set. During communication by other serial interfaces, a source serial interface must wait until communication by the other serial interfaces is completed.

According to scheme (2), transmission/reception data of an interface having lower priority is interrupted, and an interface error may occur. When a serial reception buffer or the like is arranged using hardware, the time allocated to error processing may be too short to compensate for the interface error, causing the interface to receive erroneous data. Conventional apparatuses disclosed in U.S. Pat. Ser. No. 291,349 refiled on Dec. 29, 1988, Ser. No. 393,811 refiled on Aug. 14, 1989 and Ser. No. 262,350 filed on Oct. 25, 1988, and the like are proposed as apparatuses connected to a host unit such as a printer engine and a host computer to transmit or receive various types of signals. Further improvements are still required for these apparatuses.

SUMMARY OF THE INVENTION

It is an object of the present invention to eliminate the conventional drawbacks described above.

It is another object of the present invention to improve a relay unit for a recording apparatus or the like.

It is still another object of the present invention to provide a relay unit capable of assigning new functions to a recording apparatus or the like.

It is still another object of the present invention to provide a relay unit capable of easily adding new functions without incorporating various functions in a recording apparatus such as a printer beforehand.

It is still another object of the present invention to provide a relay unit capable of smoothly performing communication with interfaces of a plurality of apparatuses.

It is still another object of the present invention to provide a relay unit capable of improving performance of a recording apparatus or the like.

The above and other objects, features, and advantages of the present invention will be apparent from the following description and appended claims in conjunction with the accompanying drawings.

DETAILED DESCRIPTION OF THE PREFERRED EMBODIMENT

An embodiment of the present invention will be described in detail with reference to the accompanying drawings.

Figure 7:
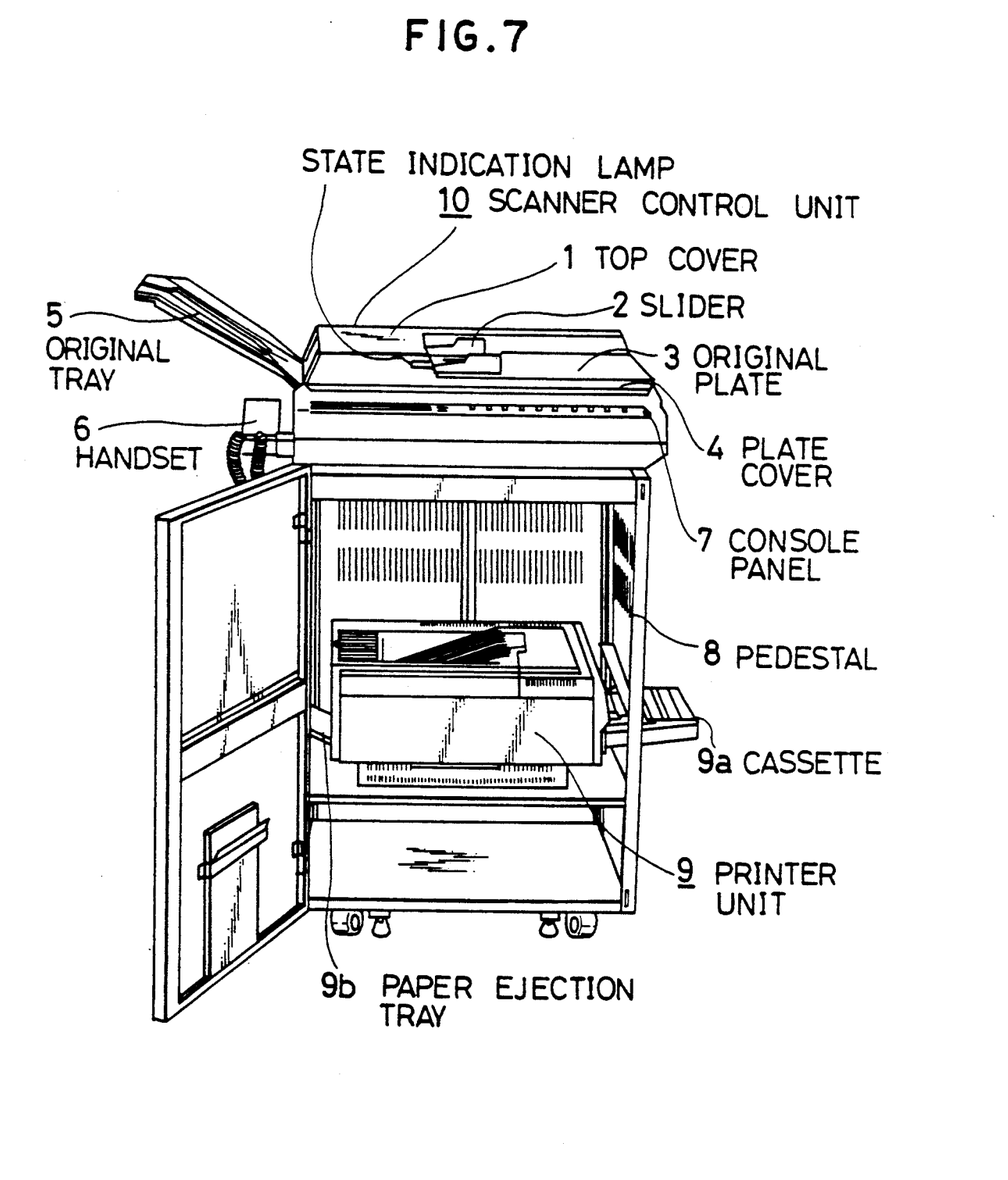
FIG. 7 is a perspective view of a laser facsimile apparatus.
Figure 8:
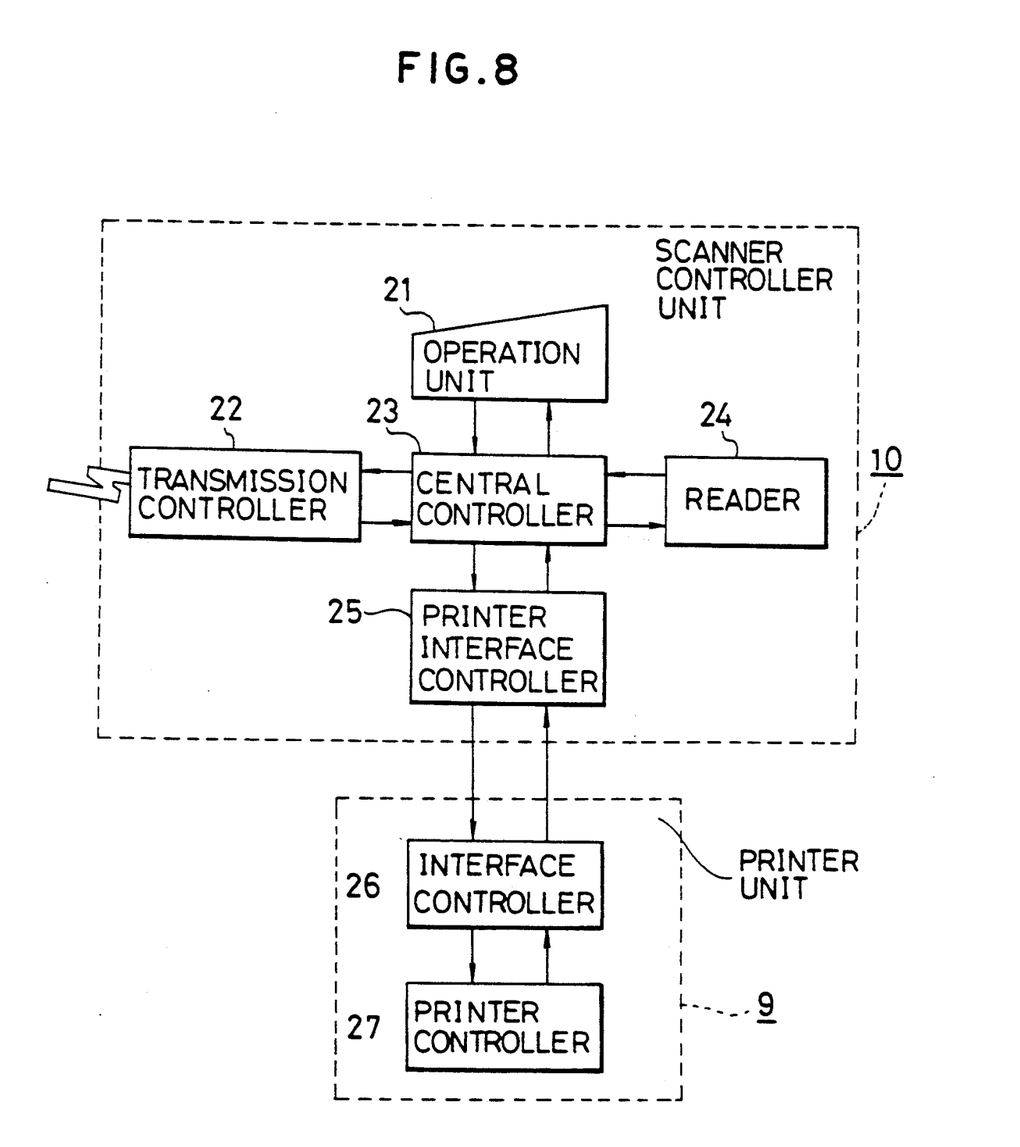
FIG. 8 is a block diagram showing a circuit corresponding to FIG. 7.

FIG. 7 is a perspective view of a laser facsimile apparatus which employs the present invention, and FIG. 8 is a schematic block diagram showing the laser facsimile apparatus shown in FIG. 7. The laser facsimile apparatus shown in FIGS. 7 and 8 functionally comprises a scanner controller unit 10 for receiving an image signal from another facsimile apparatus and alternatively for transmitting an image signal obtained by reading an original, and a printer unit 9 for performing recording on a recording sheet on the basis of the received or read image signal. A known laser beam printer can be used as the printer unit 9.

The scanner controller unit 10 and the printer unit 9 have independent housings and are connected to each other through a cable. The scanner controller unit 10 includes a top cover 1 which can be opened for releasing a paper jam, a slider 2 for adjusting an original width, an original plate 3, a plate cover 4, an original tray 5, a handset 6, a console panel 7, and a pedestal 8. The printer unit 9 includes a cassette 9a and a paper ejection tray 9b. Referring to FIG. 8, the scanner controller unit 10 includes an operation unit 21 including the console panel 7 (FIG. 7), a transmission controller 22, a central controller 23, a reader 24, and a printer interface controller 25. The printer unit 9 comprises an interface controller 26 and a printer controller 27.

Schematically the operation of the laser facsimile apparatus is performed as follows. A copy mode or a transmission mode is set at the operation unit 21, and image data obtained by causing the reader 24 to read an original is sent to the central controller 23. In the transmission mode, the image data is output to a telephone line through the transmission controller 22. However, in the copy mode, the image data is output to the printer unit 9 through the printer interface controller 25. Alternatively, reception data obtained through the telephone line is sent to the printer interface controller 25 through the transmission controller 22 under the control of the central controller 23. The printer unit 9 reads the reception data or records the read data.

In the above arrangement, a relay unit (to be described later) is connected between the scanner controller unit 10 and the printer unit 9, and the following functions can be added.

(1) Recording sheets having two different sizes can be fed.

(2) A larger number of sheets than those stored in the cassette 9a can be fed.

(3) A paper ejection position can be located outside the pedestal 8 to increase the ejection capacity.

The relay unit of this embodiment can add functions (1), (2), and (3) without changing the hardware or software specifications of the printer interface controller 25 of the scanner controller unit 10 and without changing the hardware or software specifications of the interface controller of the printer unit 9.

The relay unit of this embodiment will be described in detail below.

Figure 1:
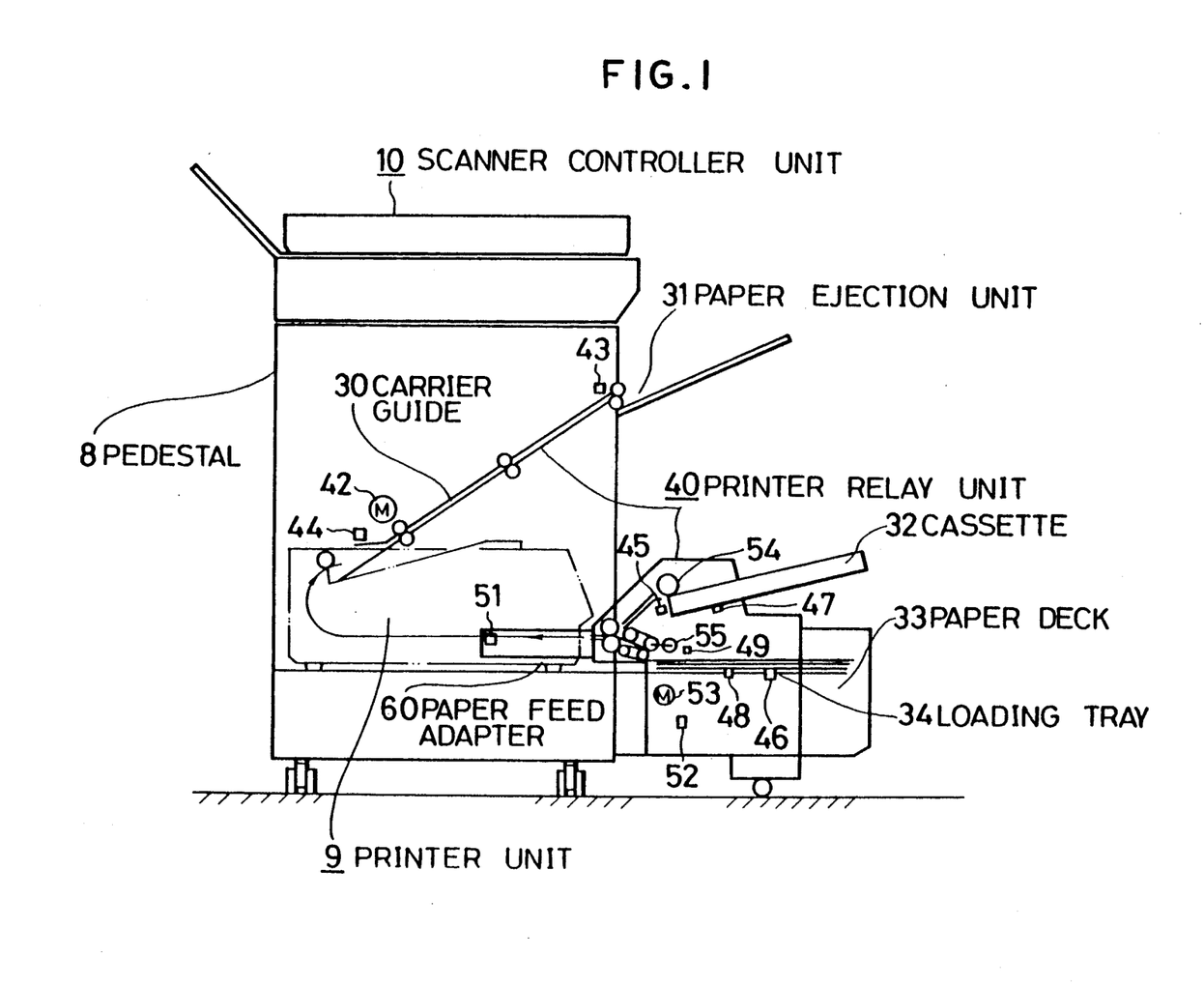
FIG. 1 is a schematic view of a laser facsimile apparatus connected to a relay unit according to an embodiment of the present invention.
Figure 2:
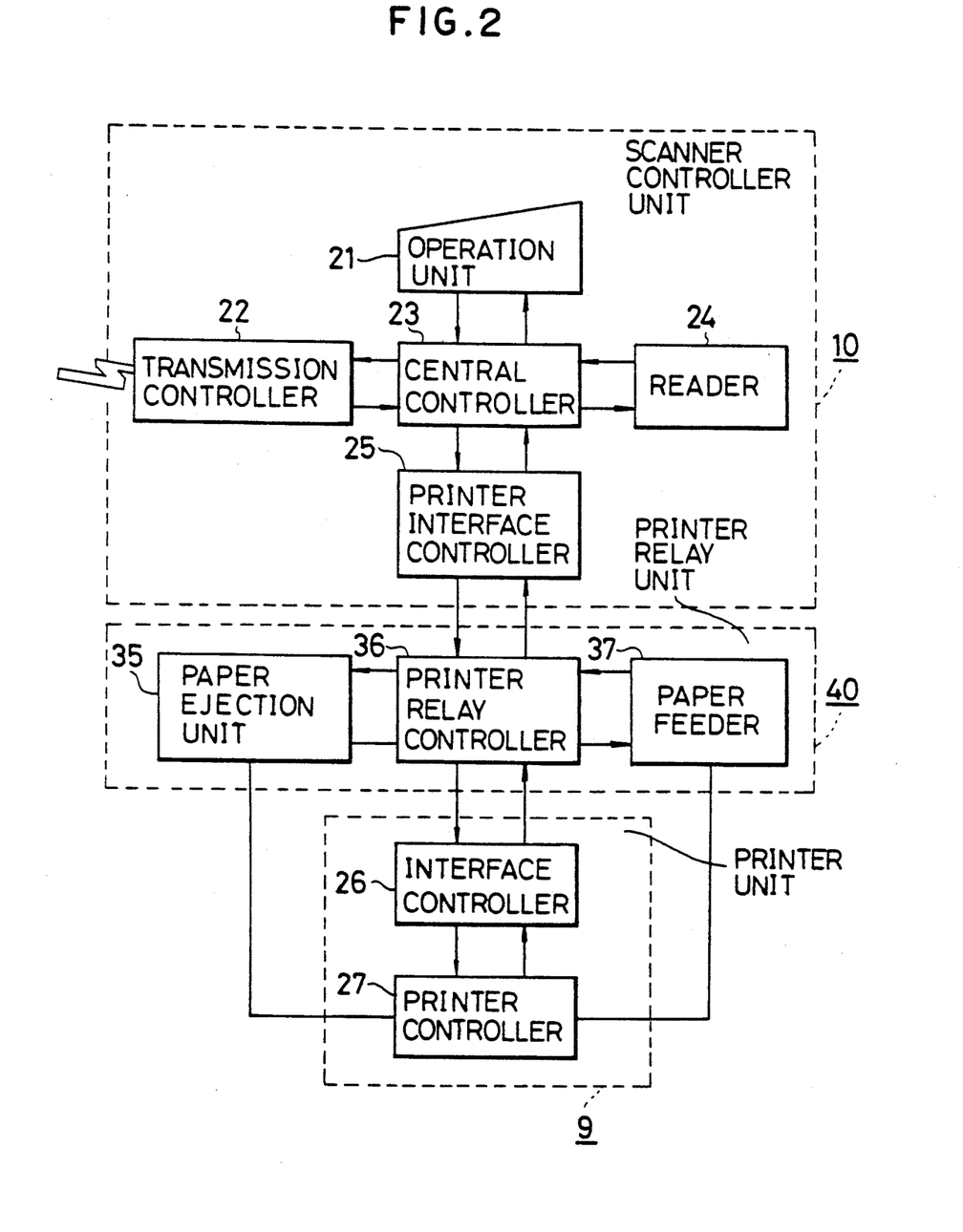
FIG. 2 is a block diagram showing a circuit corresponding to the arrangement of FIG. 1.

FIG. 1 is a schematic view of a laser facsimile apparatus connected to a relay unit (to be also referred to as a printer relay unit). FIG. 2 is a circuit diagram corresponding to FIG. 1. The same reference numerals as in FIGS. 7 and 8 denote the same parts in FIGS. 1 and 2. The laser facsimile apparatus includes a pedestal 8, a paper ejection unit 31, a scanner controller unit 10, a cassette 32 capable of storing about 200 recording sheets, a paper deck 33 capable of storing a large number of sheets (e.g., 1,000 sheets), a printer unit 9, a carrier guide 30, a loading tray 34, and a printer relay unit 40.

The arrangement of FIG. 1 is obtained by adding the carrier guide 30, the paper ejection unit 31, the external cassette paper feed cassette 32, the paper deck 33, and the like to the arrangement of FIG. 7. Components 21 to 27 in FIG. 2 have the same arrangement as those of FIG. 8. The arrangement of FIG. 2 is almost the same as that of FIG. 8 except that the printer relay unit 40 is added to the arrangement of FIG. 8. The laser facsimile apparatus also includes a paper ejection unit 35, a printer relay controller 36, and a paper feed unit 37. The operation of this embodiment up to the step of sending the image data to the printer interface controller 25 is the same as that of FIG. 8.

Image data and control signals such as commands are temporarily received by the printer relay controller 36 under the control of the printer interface controller 25. The printer relay controller 36 sends out image data and control signals such as commands to the interface controller 26 of the printer unit 9 in accordance with the content of each control signal while driving the paper feed unit 37 and the paper ejection unit 35 and receiving signals from various types of sensors.

The printer relay controller 36 also receives a state signal (status) from the printer unit 9 through the interface controller 26 and state signals from the paper ejection unit 35 and the paper feed unit 37, and sends back various state signals (status) to the printer interface controller 25. Therefore, the scanner controller unit 10 and the printer unit 9 can exchange various types of signals as if there were directly connected to each other even though the printer relay unit 40 is actually connected between the units 9 and 10.

Figure 3A:
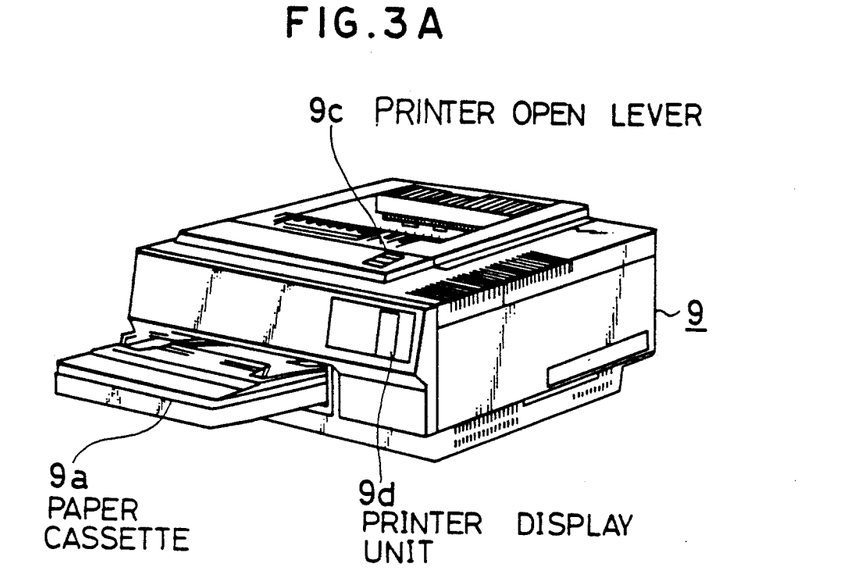
FIGS. 3A and 3B are perspective views of a printer unit.
Figure 3B:
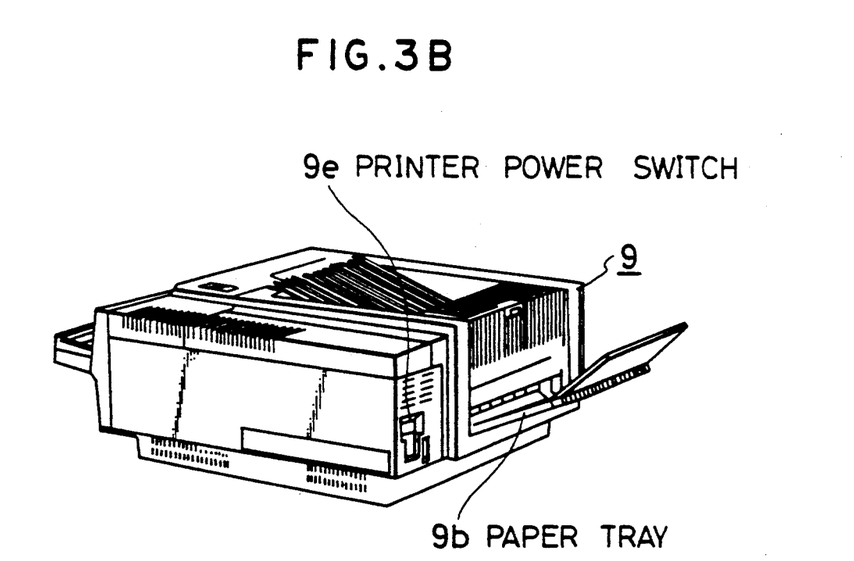

FIGS. 3A and 3B are perspective views of the printer unit 9. The printer unit 9 includes a printer open lever 9c, the paper cassette 9a, a printer display unit 9d, a printer power switch 9e, and a paper tray 9b.

Figure 4:
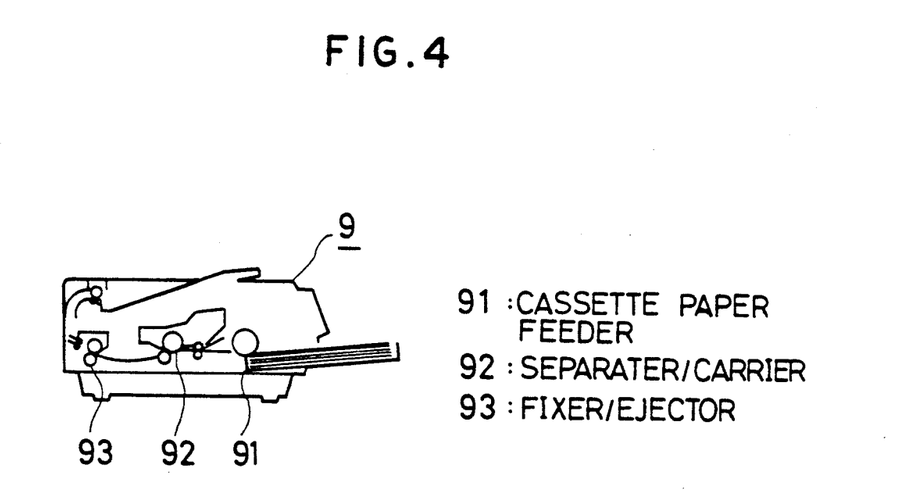
FIG. 4 is a sectional view of a recording carrier path of a printer unit.

FIG. 4 is a sectional view of a paper carrier path of the printer unit 9. The printer unit 9 includes a cassette paper feeder 91, a separator/carrier 92, and a fixer/ejector 93.

In this embodiment, a paper feed adapter 60, shown in FIG. 1, is attached to the cassette paper feeder 91 of FIG. 4, and a paper output control unit of the printer relay unit 40 shown in FIG. 1 can be connected for controlling the cassette paper feeder 91 without modifying the printer unit 9. FIG. 1 shows that, in response to a command from the paper output control unit through the paper ejection unit 35, a sheet which has passed upwardly through the fixer/ejector 93 (FIG. 4) and that would otherwise be sent rightwardly to paper tray 9b (FIG. 3B) is instead sent further upwardly by the carrier guide 30 in a path shown by arrows in FIG. 1 to the paper ejection unit 31.

Figure 5:
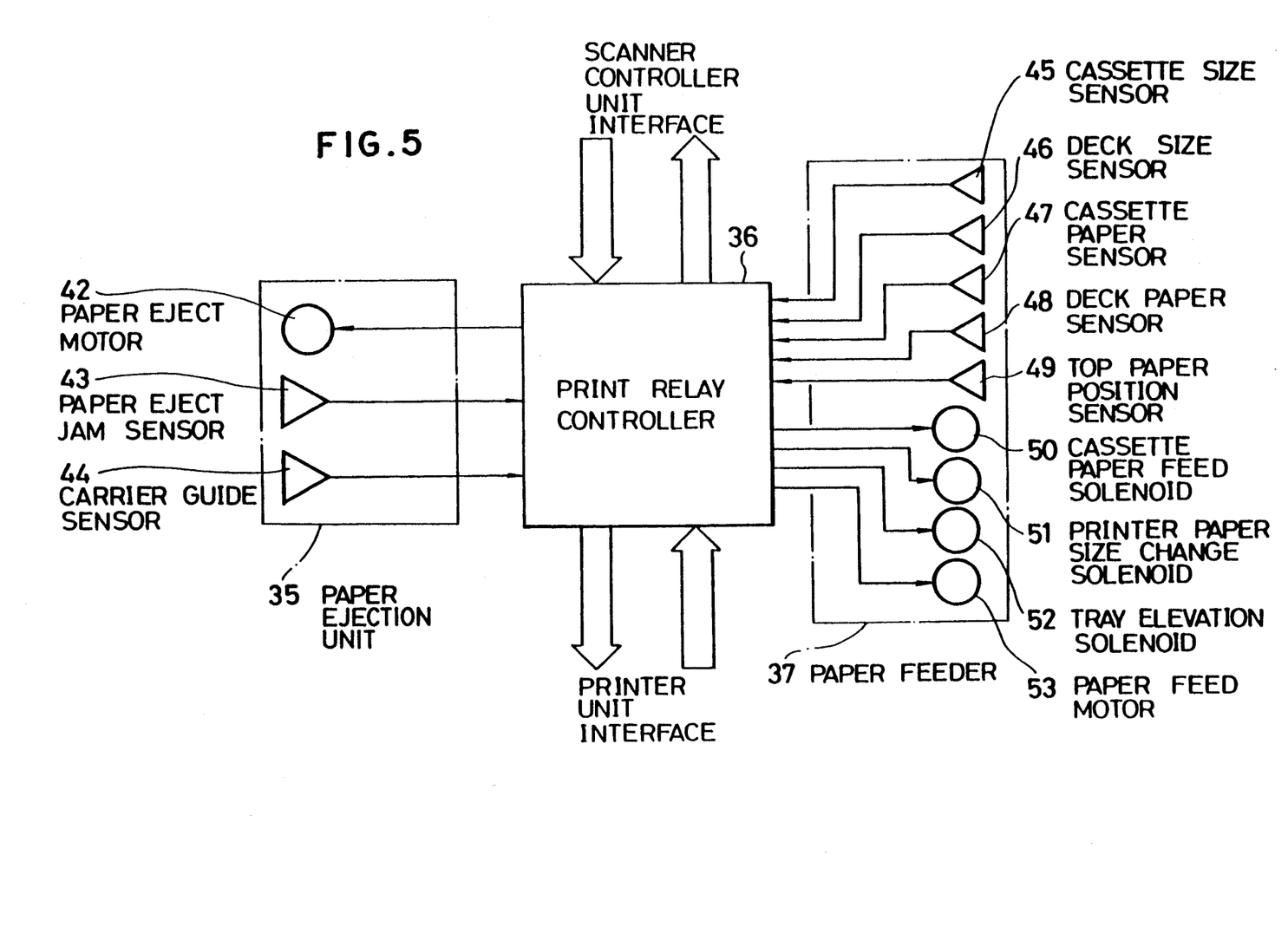
FIG. 5 is a diagram showing a printer relay unit.

FIG. 5 is a diagram showing a circuit arrangement of the printer relay unit 40. The printer relay controller 36 relays the scanner controller interface and the printer interface, receives sensor outputs from the paper ejection unit 35 and the paper feed unit 37, and controls the respective drive units.

A paper eject motor 42 causes the carrier guide 30 to carry and drive the sheet ejected onto the upper surface of the printer unit 9. A paper eject jam sensor 43 is arranged near the paper ejection unit 31 and is turned on during passing of the sheet therethrough. When the paper eject jam sensor 43 is not turned on upon a lapse of a predetermined period of time after the sheet is ejected from the printer unit 9, or when the paper eject jam sensor 43 is not turned off upon passing of the sheet within a predetermined period of time after it is turned on, the printer relay controller 36 discriminates that a paper jam occurred.

A carrier guide sensor 44 is turned on when the carrier guide 30 is attached to the printer unit 9. When the carrier guide 30 is separated from the printer unit 9 upward, the carrier guide sensor 44 is turned off. When the carrier guide sensor is kept off, the printer relay controller 36 does not cause the paper eject jam sensor 43 to detect paper jam and does not drive the paper eject motor 42.

In this case, the ejected sheets are loaded on the upper surface of the printer unit 9.

A cassette size sensor 45 is arranged on the printer relay unit at a distal end portion of the cassette 32 in FIG. 1. The cassette size sensor 45 has the same arrangement as a cassette size sensor (not shown) arranged in the cassette paper feeder 91 shown in FIG. 4.

A deck size sensor 46 detects a paper size by a position of a slider (not shown) moved in accordance with a width of recording sheets loaded on the loading tray 34.

A cassette paper sensor 47 checks the presence/absence of the recording sheets in the cassette 32.

A deck paper sensor 48 checks the presence/absence of recording sheets in the paper deck 33.

A top paper position sensor 49 checks whether the loading tray is lifted and the top sheet reaches a predetermined position.

A cassette paper feed solenoid 50 is turned on during cassette paper feeding and drives a paper pickup roller 54.

A paper pickup roller 55 on the paper deck 33 side is driven upon ON/OFF operation of a clutch (not shown).

A printer paper size change solenoid 51 is located near the cassette paper feeder 91. This solenoid 51 is turned on/off in accordance with a size of paper to be fed and drives a cassette size sensor (not shown) of the printer unit 9 under the control of the printer relay controller 36.

The printer unit 9 then hypothetically determines that a cassette of the corresponding size is attached.

A push-up spring (not shown) is disposed below the loading tray 34, and the loading tray 34 is moved upward by this spring. An actuator is attached to the distal end of a tray elevation solenoid 52 to stop upward movement of the loading tray 34. More specifically, when the solenoid 52 is kept off, upward movement of the loading tray 34 is stopped. However, when the solenoid 52 is turned on, the actuator releases locking so that the loading tray 34 is moved upward.

A paper feed motor 53 carries the sheet fed from the cassette 32 or the loading tray 34 to the interior of the printer unit 9.

Figure 6:
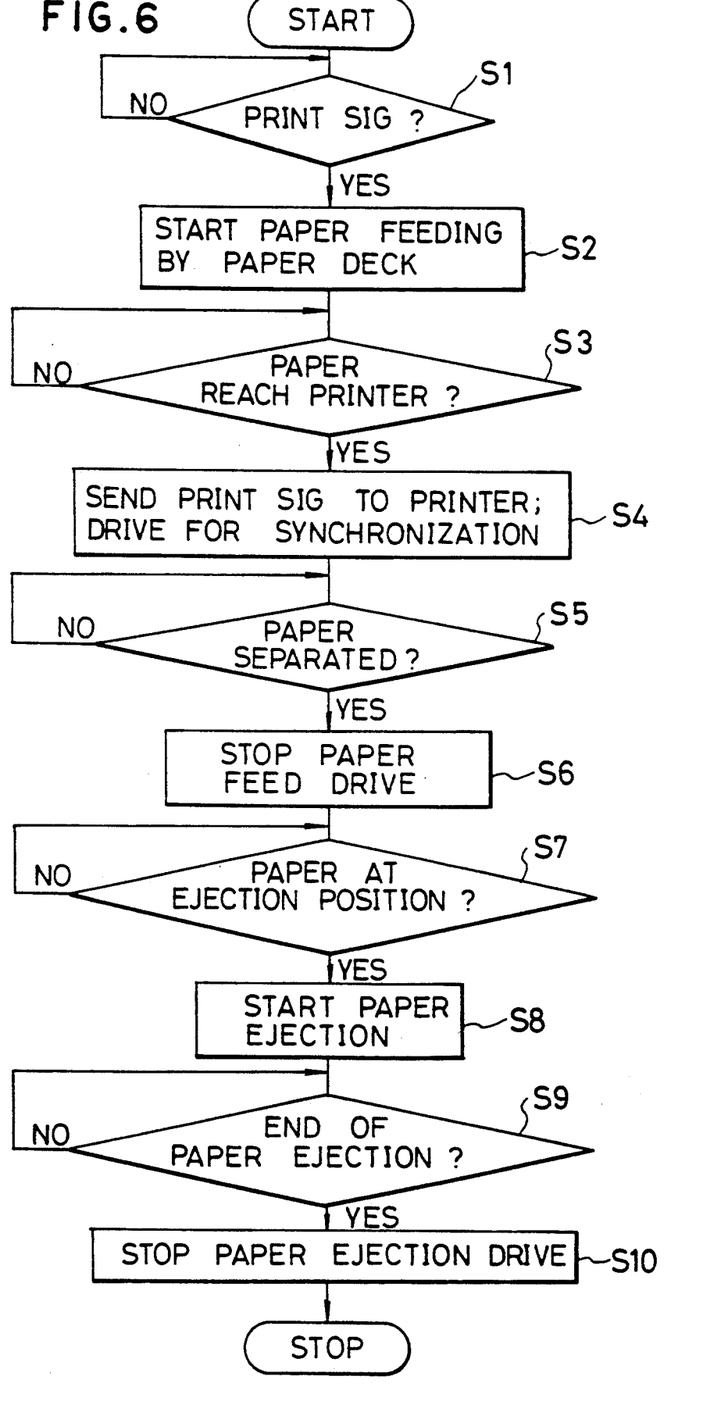
FIG. 6 is a flow chart of paper feeding/ejection.

A flow chart for feeding a sheet from the paper deck 33 and performing image recording is shown in FIG. 6 and will be described in detail below. Note that this flow chart is stored as a program in a ROM in the printer relay controller 36.

In step S1, the printer relay controller 36 waits for a print signal from the scanning controller unit 10. When the print signal is input, the flow advances to step S2. In step S2, since a sheet is fed from the paper feed unit 37 of the printer relay unit 40 on the paper deck 33 side, the paper feed motor 53 and the like are driven. In step S3, the printer relay controller 36 waits until the sheet picked up by the paper pickup roller 55 reaches a paper leading end position of the standard cassette 9a of the printer unit 9. If YES in step S3, the print signal is output to the printer unit 9 in step S4. At the same time, in synchronism with paper feeding in the printer unit, the paper feed unit 37 in the printer relay unit feeds out a sheet. In step S5, the printer relay controller waits until the trailing end of the sheet is completely fed out from the printer relay unit. In step S6, the motor and the like in the paper feed unit 37 are stopped.

In step S7, the printer relay controller waits until the sheet ejected from the fixer/ejector 93 of the printer unit 9 reaches the carrier guide 30 of the paper ejection unit 31. When the printer relay controller 36 determines that the sheet has reached the carrier guide 30, the motor 42 and the like of the paper ejection unit are started in step S8.

The printer relay controller 36 waits until the sheet is completely ejected in step S9, and driving of the paper eject motor 42 and the like is stopped in step S10.

The above sequence exemplifies feeding and ejection of one sheet from the paper deck 33. Similarly, feeding and ejection of each sheet from the cassette 32 can be performed by sending a selection signal from the scanner controller unit 10 to the printer relay controller 36.

Continuous feeding/ejection performed in a conventional printer can be performed by repeating the above sequence.

When the output timing of the print signal supplied to the printer unit 9 in step S4 is appropriately advanced in timing, a maximum throughput equal to that obtained by the single cassette 9a can be obtained.

The cassette 32 shown in FIG. 1 is equal to a cassette directly attached to the printer unit 9. However, another cassette having a larger capacity or another cassette having a different size can also be utilized.

The paper deck 33 in FIG. 1 has a larger capacity (i.e., 1,000 sheets) than the capacity (i.e., 200 sheets) of the cassette 32. In addition, A4-, B5-, and B4-sized sheets can also be used.

Only one paper ejection tray of the paper ejection unit 31 shown in FIG. 1 is used in this embodiment. However, an arrangement having a larger paper ejection capacity or an extension such as a multi-stage sorter can also be utilized.

The above embodiment exemplifies the laser facsimile apparatus. However, the present invention is also applicable to other recording apparatuses such as copying machines.

A personal computer or the like may be connected as a relay unit in place of the scanner controller unit.

As described above, the scanner control unit and the printer unit which are housed separately are connected through the relay unit, and the function of the printer unit can be improved. In this case, since modifications and changes of the printer unit and interface conditions from the scanner controller unit are not required, the function of the system can be achieved without increasing cost.

In the above embodiment, the relay unit is added to the printer unit having a limited paper feed capacity to achieve large-capacity paper feeding. When other functions in addition to the paper feed capacity are added, as needed, the functions of the system can be further improved.

The communication procedures of this embodiment will be described with reference to FIGS. 9 to 12.

Figure 9:
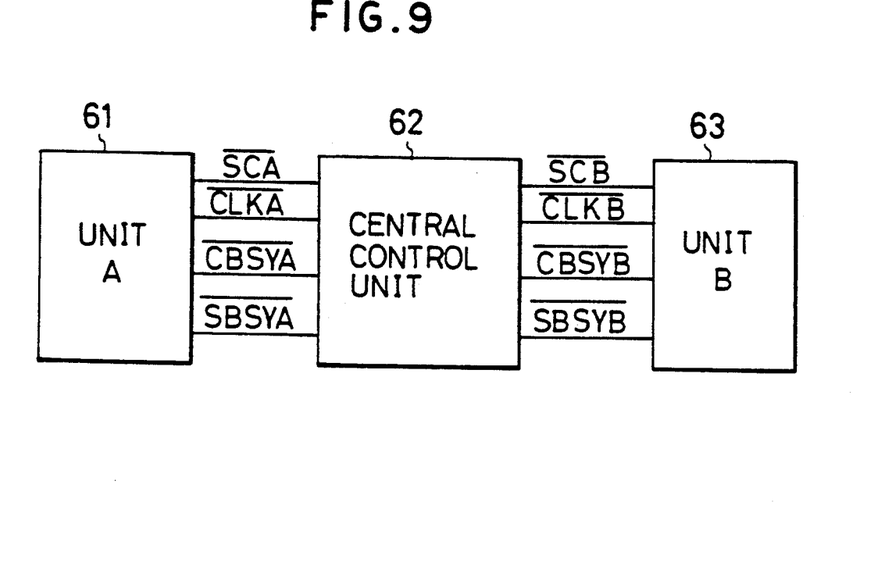
FIG. 9 is a block diagram for explaining various types of signals between units.

FIG. 9 is a view for explaining various types of signals between units. A unit A(61) corresponds to the scanner controller unit 10, a central control unit 62 corresponds to the printer relay unit 40, and a unit B(63) corresponds to the printer unit 9. The central control unit 62 is a master unit of the unit B(63) and at the same time a slave unit of the unit A(61). Therefore, the control unit 63 serves as a slave unit of the central control unit 62. Signals exchanged between the unit A, the central processing unit, and the unit B will be described below. Signals exchanged between the unit A and the central control unit 62 are affixed with letter "A", and signals exchanged between the central control unit 62 and the control unit 63 are affixed with letter "B". The $\overline{SC}$ signals, i.e., the $\overline{SCA}$ and $\overline{SCB}$ signals are bidirectional 8-bit serial signals. A serial signal sent by the master unit is called a command signal, and a serial signal sent by a slave unit is called a status signal. Interrogation between the master and slave units is performed such that the slave unit sends back a 1-byte status signal in response to a 1-byte (8 bits) command signal sent by the master unit.

The $\overline{CLK}$ signals, i.e., the $\overline{CLKA}$ and $\overline{CLKB}$ are sync clock signals (serial clock signals) for exchanging a command or status signal through the $\overline{SC}$ line.

The $\overline{CBSY}$ signals, i.e., the $\overline{CBSYA}$ and $\overline{CBSYB}$ signals are command busy signals sent to the slave unit so as to indicate that the $\overline{SC}$ and $\overline{CLK}$ lines are occupied to transmit the command through the $\overline{SC}$ line from the master unit.

The $\overline{SBSY}$ signals, i.e., the $\overline{SBSYA}$ and $\overline{SBSYB}$ signals are status busy signals sent to the master unit so as to indicate that the $\overline{SC}$ and $\overline{CLK}$ lines are occupied to transmit the status signal through the $\overline{SC}$ line from the slave unit.

The logical arrangement in the central control unit 62 will be described with reference to FIG. 10. The circuit shown in FIG. 10 constitutes part of the printer relay controller 36 shown in FIG. 5. A CPU 64 has a serial transmission terminal Tx, a serial reception terminal Rx, a serial clock terminal CLKT, a serial interface switching terminal $\overline{A}/B$, interrupt terminals INTA and INTB, and status busy terminals PA and PB. The arrangement shown in FIG. 10 also includes input buffers 65 to 75.

Outputs from the terminal $\overline{A}/B$ and the terminals PA and PB are set at high/low level by a program in the CPU, and the $\overline{CLK}$ signals and the status command $\overline{SC}$ signals are input to and output from the terminals CLKT, Tx, Rx, and the like.

Figure 11:
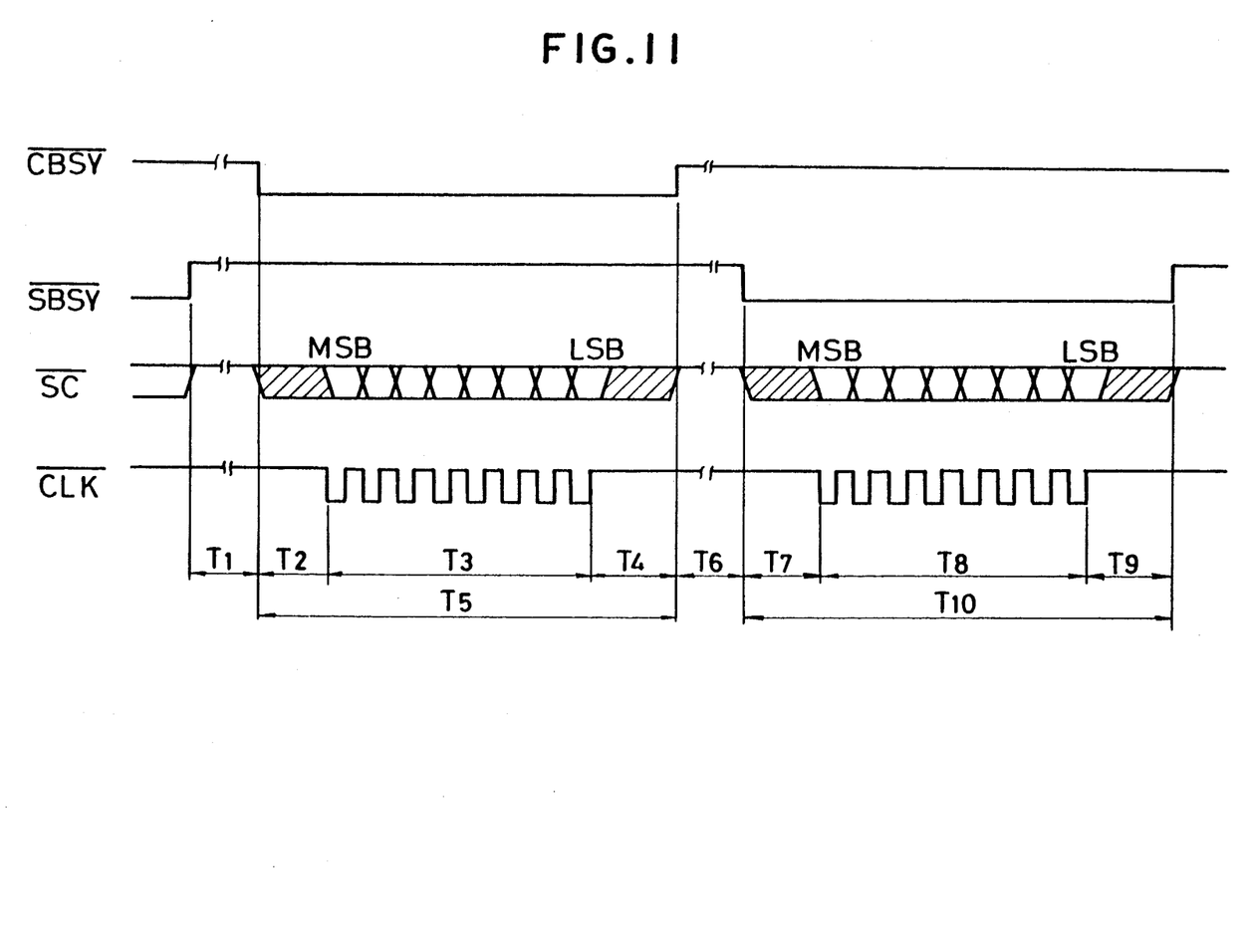
FIGS. 11 to 13 are timing charts of signals exchanged between interfaces.

A hardware protocol of the interface of each unit is shown in FIG. 11. When a command is to be sent from the master unit, the $\overline{CBSY}$ signal goes from high level to low level upon a lapse of a predetermined time T1 after a change in logical level from low level to high level of the $\overline{SBSY}$ signal is confirmed. Command data is output from its MSB onto the $\overline{SC}$ line in synchronism with the $\overline{CLK}$ serial clock signals upon a lapse of a predetermined time T2. When command data is output up to a predetermined number of bits (e.g., 8 bits), the $\overline{CBSY}$ signal goes from low level to high level upon a lapse of a predetermined time T4 after a change in logical level from low level to high level of the last clock of the $\overline{CLK}$ signal is detected.

In the slave unit, the $\overline{SBSY}$ signal goes from high level to low level upon a lapse of a predetermined time T6 and outputs status data from the MSB onto the $\overline{SC}$ line by a predetermined number of bits (e.g., 8 bits) in synchronism with the $\overline{CLK}$ serial clock signals upon a lapse of a predetermined time T7. The $\overline{SBSY}$ signal goes from low level to high level upon a lapse of a predetermined time T9 after a change in logical level from low level to high level of the last clock of the $\overline{CLK}$ signal is detected.

The master and slave units can exchange the command and status signals and perform interface control. In the central control unit 62 which serves as the master and slave units, the $\overline{CBSY}$ and $\overline{SBSY}$ signals are input to the CPU interrupt terminals INTA and INTB, and the interrupt mode of the CPU is ready to start.

Figure 12:
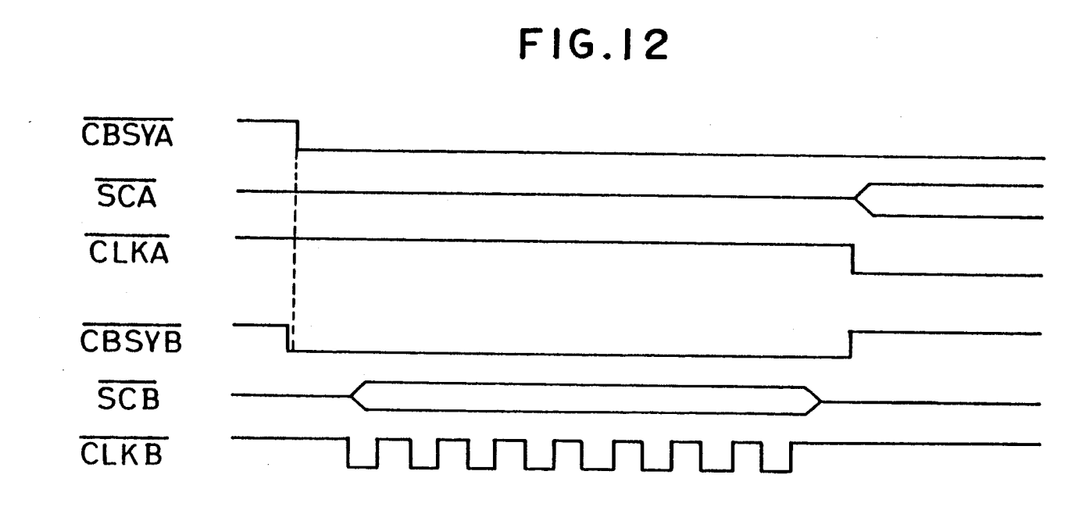

FIG. 12 is a timing chart for explaining communication procedures in the central control unit 62. In this time chart, after the $\overline{CBSYA}$ signal goes from high level to low level, a time slot until the command data $\overline{SCA}$ and the serial clock $\overline{CLKA}$ are output, i.e., one clock period of the $\overline{CLKA}$ signal, is assured.

A clock period $T_{CLKB}$ of the $\overline{CLKB}$ signal has the following relationship with a clock period $T_{CLKA}$ of the $\overline{CLKA}$ signal:

$$(T_{CLKB} \times (N+1)) < T_{CLKA} \qquad (1)$$

where N is the number of bits of the command/status signal.

Figure 10:
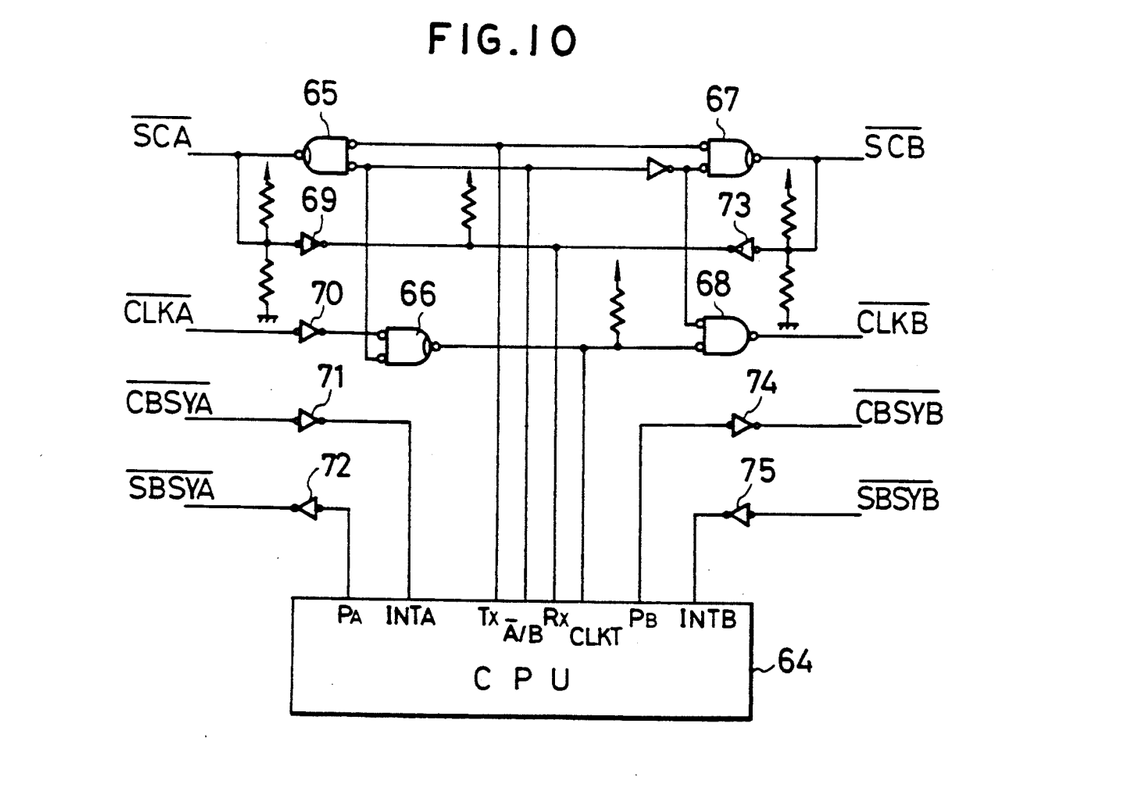
FIGS. 10 is a circuit diagram of a central control unit 62.

Referring to FIG. 10, when the $\overline{CBSYA}$ signal goes from high level to low level, an interrupt is supplied to the CPU 64 to detect that a command signal input is designated by the unit A. At this moment, the CPU determines whether the interface of the unit B is busy. If the interface is busy, only present one-command transmission or one-status reception is continued. Thereafter, communication with the unit B is interrupted, and the communication source is switched to the unit A. FIG. 12 shows s state wherein the unit A generates a serial command input interrupt immediately after the command busy signal $\overline{CBSYB}$ is sent to the unit B.

FIG. 12 shows a case of N=8 in equation (1). As shown in FIG. 12, sending of the command signal to the unit B can be completed before the command data $\overline{SCA}$ is sent out from the unit A. If the output from the $\overline{A}/B$ goes from high level to low level immediately after the $\overline{CBSYB}$ signal goes from low level to high level, the command data from the unit A can be received by the unit B without interrupting transmission of the command data to the unit B.

In FIG. 12, the $\overline{CBSYA}$ signal goes to low level immediately after the $\overline{CBSYB}$ signal goes to low level. However, even if the timing at which the $\overline{CBSYB}$ signal goes to low level is equal to the timing at which the $\overline{CBSYA}$ signal goes to low level, the command data is not sent from the unit A before the end of command transmission to the unit B since the period of the $\overline{CLKA}$ signal is long enough.

Figure 13:
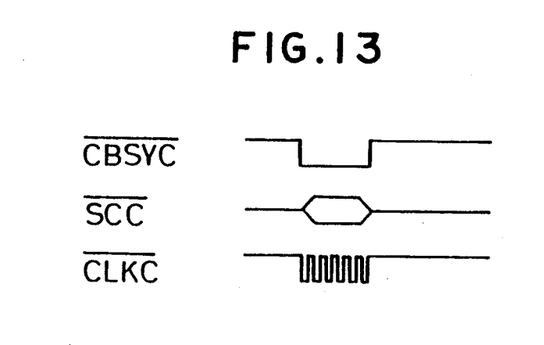

In this embodiment, the number of the $\overline{CLK}$ signal pulses is set to be N=8. However, this number may be arbitrarily set. Two serial interfaces of the units A and B are used in this embodiment. As shown in FIG. 13, a faster serial clock $\overline{CLKC}$ may be used to connect a unit C to the units A and B. Similarly, the number of units connected to each other can be arbitrarily increased.

As has been described above, when a relay unit is simultaneously connected to a plurality of serial interfaces to exchange various types of signals such as command and status signals, the serial clock speeds of the plurality of serial interfaces can be changed by a simple arrangement. Therefore, external interface equipment need not detect whether the interface signal lines are busy and can properly communicate with each other without waiting or interruption.

The present invention is not limited to the particular embodiment described above. Various changes and modifications may be made within the scope of the appended claims.

What is claimed is:

1. A recording system comprising:
    an image data transmission source for sending image data;

a recording apparatus for performing a recording operation on the basis of the image data; and a relay unit connectable between said image data transmission source and said recording apparatus, including means for relaying signals transferred between said image data transmission source and the recording apparatus, and means for adding a specific function to said recording apparatus, wherein said system performs the recording operation without using the specific function when said image data transmission source directly connects with said recording apparatus without connecting said relay unit, and wherein said system is capable of performing the recording operation using the specific function when said relay unit connects between said image data transmission source and said recording apparatus.

2. A system according to claim 1, wherein said relay unit causes said image data transmission source and said recording apparatus to exchange signals so as to allow an operation equal to an arrangement in which said image data transmission source and said recording apparatus are directly connected to each other.

3. A system according to claim 1, wherein the specific function is a function of attaching a recording sheet storage unit having a larger capacity than that of a standard recording sheet storage unit of said recording apparatus.

4. A system according to claim 1, wherein said image data transmission source comprises a scanner unit for reading an original.

5. A system according to claim 1, wherein the specific function is a function of simultaneously attaching a plurality of recording sheet storage units respectively capable of storing recording sheets having different sizes.

6. A system according to claim 1, wherein the specific function is a function of changing a paper ejection position of a recorded sheet.

7. A relay unit connectable between first and second apparatus, comprising:

first and second communicating means for communicating serial data of predetermined bits with the first and second apparatus, respectively, wherein transfer of the serial data of predetermined bits using said second communicating means is completed during a time interval from an input timing of a signal representing a start of serial data transfer using said first communicating means to the start of the serial data transfer using said first communicating means.

8. A unit according to claim 7, wherein said unit sets frequencies of sync clocks used for the serial data transfer using the second communicating means so that the serial data transfer can be completed during said time interval.

9. A relay unit according to claim 8, wherein said relay unit is simultaneously connectable to an image data transmission source for sending image data and a recording apparatus for performing recording in accordance with the image data.

10. A unit according to claim 9, wherein said relay unit means adds a specific function to said recording apparatus.

11. A unit according to claim 10, wherein the specific function is a function of attaching a recording sheet storage unit having a larger capacity than that of a standard recording sheet storage unit of said recording apparatus.

12. A device detachably connected between an image data transmission source for sending image data and a recording apparatus for performing a recording operation in accordance with the image data, for optionally adding a specific function to the recording apparatus, comprising:

means for performing the specific function; and relay means electrically connected between the image data transmission source and the recording apparatus for relaying signals transferred between the image data transmission source and the recording apparatus, wherein said relay means controls input and/or output timings of the signals on the basis of an output of the performing means, and controls a performing means on the basis of the signals inputted from the image data transmission source or the recording apparatus, so that the recording operation using the specific function can be performed.

13. A device according to claim 12, wherein frequencies of sync clock signals used for data transfer are different between said relay means.

14. A device according to claim 12, wherein the specific function is a function of a attaching a recording sheet storage unit having a larger capacity than that of a standard recording sheet storage unit of the recording apparatus.

15. A device according to claim 12, wherein the image data transmission source has a facsimile function.

16. A device according to claim 12, wherein the specific function is a function of simultaneously attaching a plurality of recording sheets storage units capable of storing recording sheets having different sizes.

17. A device according to claim 12, wherein the specific function is a function of changing a paper ejection position of a recorded sheet.

18. A device according to claim 12, wherein the image data transmission source comprises a scanner unit for reading an original.

19. A system according to claim 1, wherein the image data transmission source has a facsimile function.

* * * * *

UNITED STATES PATENT AND TRADEMARK OFFICE
CERTIFICATE OF CORRECTION

PATENT NO. : 5,218,446
DATED : June 8, 1993
INVENTOR(S) : IKUO SOBUE

It is certified that error appears in the above-identified patent and that said Letters Patent is hereby corrected as shown below:

COLUMN 1

Line 49, "it" should read --its--.

COLUMN 4

Line 20, "there" should read --they--.

COLUMN 8

Line 3, "time" should read --timing--.
Line 24, "s" should read --a--.

COLUMN 10

Line 39, "a" (second occurrence) should be deleted.

Signed and Sealed this

Twenty-ninth Day of March, 1994

Attest:

BRUCE LEHMAN

Attesting Officer   Commissioner of Patents and Trademarks